Patented Feb. 13, 1945

2,369,262

UNITED STATES PATENT OFFICE 2,369,262

TITANIUM LIQUOR HYDROLYSIS

Henry Moroni Stark, Wilmington, Del., assignor to E. I. du Pont de Nemours & Company, Wilmington, Del., a corporation of Delaware No Drawing. Application November 4, 1939, Serial No. 302,850

9 Claims. (Cl. 23—202)

This invention relates to the production of improved titanium oxide pigments, and more particularly to a novel method for hydrolyzing titanium salt solutions used in the production of such pigments.

More specifically, the invention relates to a novel method of accelerating the hydrolysis of titanium salt solutions through employment of a negative-charged nucleating or accelerating agent which comprises a colloidal titanium oxide sol.

Various methods are already known whereby the acceleration of the hydrolysis of titanium salt solutions may be effected, as are various types of seeding agents which may be employed therein. However, most of these processes fail to provide the desired high, increased yield in raw $TiO_2$ precipitate, and, additionally, are disadvantageous from other standpoints. Thus, one prior method proposes to effect nucleation through use of relatively large quantities of raw, untreated titanium oxide pigment from a previous hydrolysis. Aside from being highly uneconomical and therefore commercially unattractive due to such required use of large amounts of raw pigment precipitate, no marked or significant benefits appear to arise when resort is had to such process.

It has been found that the disadvantages existent in prior methods for accelerating the hydrolysis of titanium salt solutions can be effectively overcome, and it is among the objects of this invention, therefore, to provide a novel method for attaining such results. A particular object is to provide a novel process for accelerating the hydrolysis of titanium salt solutions and through use of a novel type of nucleating or accelerating agent. A further object is to provide a process in which production of increased, high yields of an improved titanium oxide precipitate and final pigment is assured, said pigment possessing improved tinting strength and excellent color characteristics. An additional, specific object is to provide a process for obtaining a titanium oxide pigment which exhibits substantially the X-ray diffraction pattern of rutile. Other objects and advantages will appear as the ensuing description proceeds.

These and other objects are attainable in this invention which comprises accelerating the hydrolysis of titanium salt solutions, and particularly titanium chloride, by employing as a seeding agent in such hydrolysis a negatively-charged colloidal sol of titanium oxide.

The negatively-charged titanic acid sol useful in this invention for accelerating hydrolysis reactions is preferably prepared by imparting a reverse charge to a positively-charged titanic acid sol or gel, such as results from the peptization of orthotitanic acid by treatment with a monobasic acid, such as hydrochloric or nitric acid. Thus, in effecting such reversal, one or more alkaline agents, particularly those containing polyvalent anions, may be suitably incorporated, through addition, with accompanying stirring, if necessary, in a positively-charged $TiO_2$ sol; or, if desired, may be added to a suitable quantity of a slurry of unpeptized, raw $TiO_2$ precipitate obtained from the normal hydrolysis of a titanium salt solution, such as the chloride, sulfate, nitrate, etc. The alkali salts of citric acid, especially potassium citrate, are particularly efficacious and useful in the invention and such types of alkaline agents are therefore preferred. Preferably, the amount of polyvalent anion so used is sufficient to neutralize the positive charge of the titanium oxide sol and impart the desired negative charge thereto. Advantageously, and in order to obtain more complete peptization after addition of the alkaline-charge reversing agent, the sol is rendered substantially neutral or slightly alkaline in reaction by the addition thereto of a suitable quantity of a soluble base, such as an alkali hydroxide (sodium, potassium, ammonium, etc.) or an alkali metal carbonate.

After its preparation, a relatively small amount of the negatively-charged sol is incorporated in a titanium salt solution to be hydrolyzed and hydrolysis of the seeded solution is then effected in accordance with well-known procedures. While particularly adaptable for seeding titanium chloride solutions to obtain an improved rutile titanium oxide pigment as a final product, the negatively-charged seeding agent may also be used for seeding other types of titanium salt solutions, such as the sulfate, nitrate, fluoride, etc. Specific examples of useful types of hydrolyzable titanium solutions to which the invention may be applied and suitable methods for preparing such solutions and processing the hydrolysate recovered to produce a satisfactory titanium oxide pigment, include those set out in the previously issued U. S. patents to Blumenfeld Reissue 18,854, or Kubelka et al. 2,062,133.

To a more complete understanding of the invention, the following specific examples are given, it being understood, however, that such examples are merely illustrative in character and not intended to be in limitation of the invention:

Example I

A positively-charged $TiO_2$ sol was prepared by precipitating orthotitanic acid from a titanium chloride solution with ammonia, washing the precipitate free of soluble chlorides, slurrying in water, and peptizing by heating at a concentration of 30 g. $TiO_2$ per liter and 0.3 normal with respect to HCl for 20 minutes at 80° C. Reversal of the positive charge of the sol to the negative was effected by adding to the positively-charged, translucent sol an amount of potassium citrate ($K_3C_6H_5O_7.H_2O$) equivalent to 1.35 grams per gram $TiO_2$ in the sol (equivalent to 0.04 gram per gram $TiO_2$ in the solution to be hydrolyzed). The sol flocculated on addition of the first quantity of potassium citrate but cleared on further addition so that it was as clear as the original positively-charged sol. The resulting reversed or negatively-charged sol was then added to a solution of titanium chloride containing 110 g. $TiO_2$ per liter. The amount of $TiO_2$ in the seed added was equivalent to 3% of the theoretical weight of the $TiO_2$ in the hydrolysis. The seeded solution was heated to 95° C. and held at that temperature for substantially 30 minutes. The yield in the hydrolysis was 97.7%. The resultant precipitate was rutile. When the washed rutile precipitate was calcined at 850° C., an excellent rutile pigment was obtained, having a strength of 205% compared with 150% for commercial anatase.

In the foregoing example the quantity of potassium citrate may, if desired, be considerably increased with the result that there is a more rapid reversal of the charge, and the washed hydrolysis precipitate, when calcined at 850° C., gives a rutile pigment of high tinting strength and excellent color.

Example II

An HCl-peptized $TiO_2$ sol prepared by adding HCl to a desulfated anatase raw pigment product obtained by the hydrolysis of titanium sulfate solution was reversed in charge by addition of potassium citrate. To a volume of the positive sol containing 45 parts $TiO_2$ and 2 parts HCl was added 6 parts of crystalline potassium citrate. The resulting sol was then neutralized and repeptized by addition of a solution containing 2.5 parts sodium hydroxide. This sol was added as seed to the hydrolysis of a solution of titanium chloride. The amount added was 3% on the pigment basis. The seeded solution was heated to 95° C. and held at this temperature for 30 minutes. The yield at the end of this period was above 95%. The product was rutile. When calcined a rutile pigment of high tinting strength and excellent color was obtained.

Example III

Anatase raw pigment produced by the hydrolysis of titanium sulfate solution was peptized without prior removal of the $H_2SO_4$ which is not removed by ordinary washing. To a slurry containing 26 parts $TiO_2$ was added a solution containing 8 parts of trimethylbenzyl ammonium hydroxide. After standing overnight at room temperature, the $TiO_2$ was completely dispersed to form a semi-transparent sol. A quantity of this sol was added to a solution of titanium chloride to give a suspension in which 3% of the total $TiO_2$ was in the sol form. The seeded solution was heated to 95° C. and held at that temperature for 30 minutes. About 95% of the $TiO_2$ in solution was precipitated. The precipitate was washed, dried and calcined. The calcined product was a rutile pigment of high tinting strength and of excellent color.

As will be evident, the invention affords production of an improved type of titanium oxide pigment which is normally characterized by the rutile crystalline structure. Also, use of the novel accelerating agent of this invention not only affords a desirably high and substantially increased yield of hydrolysate, but the final titanium oxide pigment, in addition to exhibiting excellent color characteristics, is greatly improved in tinting strength and highly superior in this respect to commercial anatase. While, preferably, the negatively-charged sol is prepared from one which exhibits a positive charge and the charge on the sol particles is reversed through potassium citrate treatment, as illustrated, the invention is obviously not limited thereto nor to the temperatures, proportions, concentrations or particular negative charge-imparting agents mentioned. In its broader aspects, the invention contemplates, as noted, effecting hydrolysis of titanium salt solutions in the presence of negatively-charged colloidal sols of titanium oxide, whereby initiation and acceleration of the hydrolysis will be more effectively had.

In general, the type and character of the hydrolysate which is obtained depends largely upon the type of seed nuclei used in the hydrolysis. Accordingly, in the preparation of the seed nuclei many variables may be introduced, whereby one may exert an effective control over the yield, crystal form and filtering properties of the raw pigment, as well as over the characteristics of the final calcined pigment.

Though the invention has been illustrated in connection with the employment of specific negative sol-forming agents, it is not, as stated, limited thereto. In producing the negatively-charged accelerating agent, use is contemplated of all types of compounds and which have the property of either forming the negative $TiO_2$ sol directly by peptization of the raw pigment (Example III above), or which function to reverse the positive charge of the $TiO_2$ sol and effect its repeptization (Example I above). These negative charge-imparting agents have the common property of having anions of relatively strong or highly adsorptive capacity. Examples of such agents include the alkali metal (sodium, potassium, lithium) or ammonium salts of such polybasic hydroxy acids as citric, tartaric, tannic, gallic, tartronic, malic, etc. Other types of effective alkaline agents adapted to impart a desired negative charge to a titanium oxide sol include the well-known quaternary basic compounds, particularly the quaternary ammonium bases, such as tetramethyl ammonium hydroxide, tetraethyl ammonium hydroxide, tetramethyl ammonium iodide, etc., and in particular the trimethylbenzyl ammonium hydroxide mentioned above; or such amines as triethanolamine; or inorganic compounds such as the alkali metal silicates, particularly sodium silicate. As has been indicated, the amount of polyvalent anion used to impart a negative charge to the sol is preferably sufficient to effect direct peptization of the raw pigment to be employed in the sol or to neutralize the positive charge of said sol and impart the desired negative charge thereto. As stated, the preferred method of preparing the negatively-charged sol is first to prepare a positive sol and then reverse the charge on the sol particles with a suitable anion-containing agent, such as potassium citrate. It will be found that when relatively small amounts of the latter agent are used, coagulation of the positive sol will ensue. Generally, and in such instance, it has been found that the minimum amount adapted to give repeptization on the negative side is about 1.2 grams potassium citrate ($K_3C_6H_5O_7.H_2O$) per gram $TiO_2$ in sols of the type illustrated in Example I. This minimum amount, however, depends on the concentration of hydrochloric acid used in peptizing the titanium hydrate to prepare the positive sol. If lesser amounts of hydrochloric acid are used, proportionately lower amounts of potassium citrate will be required to give desired, complete reversal.

Again, while preparation of the negatively-charged sol is preferably effected by reversing a sol having a charge which is positive in character and prepared by peptizing orthotitanic acid, other forms of $TiO_2$ may be used. Thus, desulfated raw pigments such as produced commercially by hydrolysis of titanium sulfate solutions may be suitably peptized with a monobasic acid, such as hydrochloric, and the positive charge of the sol reversed by addition of potassium citrate or other reversing agent. Preparation of negatively-charged sols from anatase raw pigment containing appreciable amounts of $H_2SO_4$ (not desulfated after washing) is also contemplated, as illustrated in Example III above. An agent which is most usefully adaptable for peptizing acid-containing raw pigments comprises trimethylbenzyl ammonium hydroxide employed in said example. The amount of agent preferably used to peptize normal plant raw pigments containing about 10% $H_2SO_4$ on the $TiO_2$ basis is about 1 part of pure agent for 3.7 parts $TiO_2$. When the raw pigment is first desulfated, the amount preferably employed is about 1 part of agent for 12 parts $TiO_2$.

The amount of negatively-charged sol required to initiate and accelerate the hydrolysis of a titanium liquor will be found relatively small and subject to variance. Thus, in Example I above, the amount used as a seed was 3% on the $TiO_2$ basis. Such amount, however, is merely preferred. As stated, only relatively small amounts of seeding agent need be employed in most instances. Thus, amounts ranging from about 0.5 to 10% on the $TiO_2$ basis are usually sufficient for most practical purposes. Obviously, should use of greater amounts be desired, they can be readily employed.

I claim as my invention:

1. A process for accelerating the hydrolysis of titanium salt solutions which comprises conducting said hydrolysis in the presence of an added negatively-charged, peptized titanium oxide sol prepared by mixing a polyvalent anion-containing alkaline agent with a positively-charged titanium oxide sol in amount sufficient to effect a reversal of the charge of said sol from positive to negative.

2. A process for accelerating the hydrolysis of a titanium chloride solution which comprises conducting said hydrolysis in the presence of an added nucleating agent comprising a small amount of a peptized, negatively-charged titanium oxide sol prepared by mixing a water-soluble, alkaline salt of a hydroxy polycarboxylic acid with a positively-charged titanium oxide sol in amount sufficient to effect a reversal of the charge of said sol from positive to negative.

3. A process for initiating and accelerating the hydrolysis of a titanium salt solution which comprises admixing therewith a small amount of a peptized, negatively-charged $TiO_2$ sol and hydrolyzing the resulting mixture, the negative charge of said sol having been imparted thereto by addition of a polyvalent anion-containing alkaline agent to a positively-charged titanic acid sol in sufficient amount to effect a reversal of the charge of said sol from positive to negative.

4. A process for initiating and accelerating the hydrolysis of a titanium chloride solution which comprises admixing from about .5 to 10%, on the $TiO_2$ basis, of a peptized, negatively-charged $TiO_2$ sol with said solution and hydrolyzing the resulting mixture, the negative charge of said sol having been imparted thereto by addition of a sufficient amount of an alkali salt of a polybasic hydroxy organic acid to a positively-charged titanic acid sol as will effect a reversal of the charge of said sol from positive to negative.

5. A process for initiating and accelerating the hydrolysis of a titanium chloride solution which comprises admixing with said solution from about .5 to 10%, on the $TiO_2$ basis, of a peptized, negatively-charged $TiO_2$ sol and then hydrolyzing the resulting mixture, said negative charge of said sol having been imparted thereto by adding a sufficient amount of an alkali salt of citric acid to a positively-charged titanic acid sol as will effect a reversal of the charge of said sol from positive to negative.

6. A process for initiating and accelerating the hydrolysis of a titanium chloride solution which comprises admixing from about 3% on the $TiO_2$ basis of a peptized, negatively-charged $TiO_2$ sol with said solution and hydrolyzing the resulting mixture, the negative charge of said sol having been imparted thereto by addition to a positively-charged titanic acid sol of a sufficient amount of potassium citrate to effect a reversal of the charge of said sol from positive to negative.

7. A process for initiating and accelerating the hydrolysis of a titanium salt solution which comprises admixing from about .5% to 10%, on the $TiO_2$ basis, of a peptized, negatively-charged $TiO_2$ sol and hydrolyzing the resulting mixture, the negative charge of said sol having been imparted thereto by addition of a polyvalent anion-containing alkaline agent to a positively-charged titanic acid sol in sufficient amount to effect a reversal of the charge of said sol from positive to negative.

8. A process for initiating and accelerating the hydrolysis of a titanium sulfate solution which comprises admixing from about .5% to 10%, on the $TiO_2$ basis, of a peptized, negatively-charged $TiO_2$ sol with said solution and hydrolyzing the resulting mixture, the negative charge of said sol having been imparted thereto by addition of a sufficient amount of an alkali salt of a polybasic hydroxy organic acid to a positively-charged titanic acid sol as will effect a reversal of the charge of said sol from positive to negative.

9. A process for initiating and accelerating the hydrolysis of a titanium sulfate solution which comprises admixing with said solution from about .5% to 10%, on the $TiO_2$ basis, of a peptized, negatively-charged $TiO_2$ sol and then hydrolyzing the resulting mixture, said negative charge of said sol having been imparted thereto by adding a sufficient amount of an alkali salt of citric acid to a positively-charged titanic acid sol as will effect a reversal of the charge of said sol from positive to negative.

HENRY MORONI STARK.